Aug. 8, 1933.  J. W. SWALLEN  1,921,550
TIRE PRESSURE INDICATOR
Filed May 15, 1931  2 Sheets-Sheet 1

Inventor
James W. Swallen

By Clarence A. O'Brien
Attorney

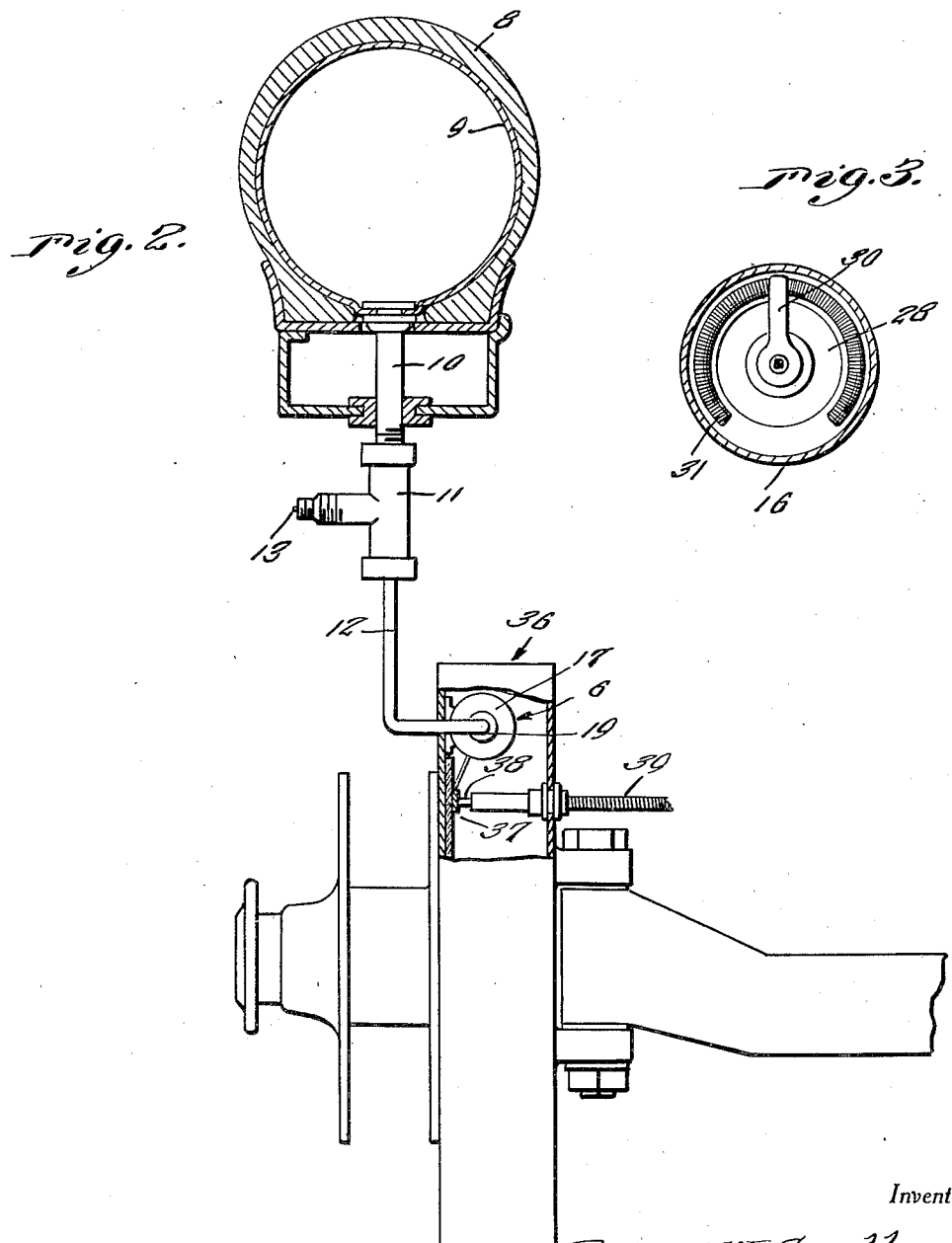

Patented Aug. 8, 1933

1,921,550

UNITED STATES PATENT OFFICE 1,921,550

TIRE PRESSURE INDICATOR

James W. Swallen, Kansas City, Mo.

Application May 15, 1931. Serial No. 537,704

2 Claims. (Cl. 201—48)

This invention appertains to new and useful improvements in indicators, and more particularly to a novel indicator for automobiles operative to indicate the existing pressure in each of the wheels of the vehicle.

The principal object of this invention is to provide a simple and inexpensive electrical indicator for ascertaining the tire pressure of pneumatic wheels.

Another important object of the invention is to provide a tire pressure indicating strip for automobiles, positive acting, substantially foolproof, and not susceptible to the developments of ready defects.

These and other important objects and advantages of the invention will become apparent to the reader of the following specification.

In the drawings:—

Fig. 2 represents a fragmentary detailed sectional view disclosing the wheel mechanism of the indicator.

Fig. 3 represents a sectional view taken substantially on the line 3—3 of Fig. 4.

Figure 1:
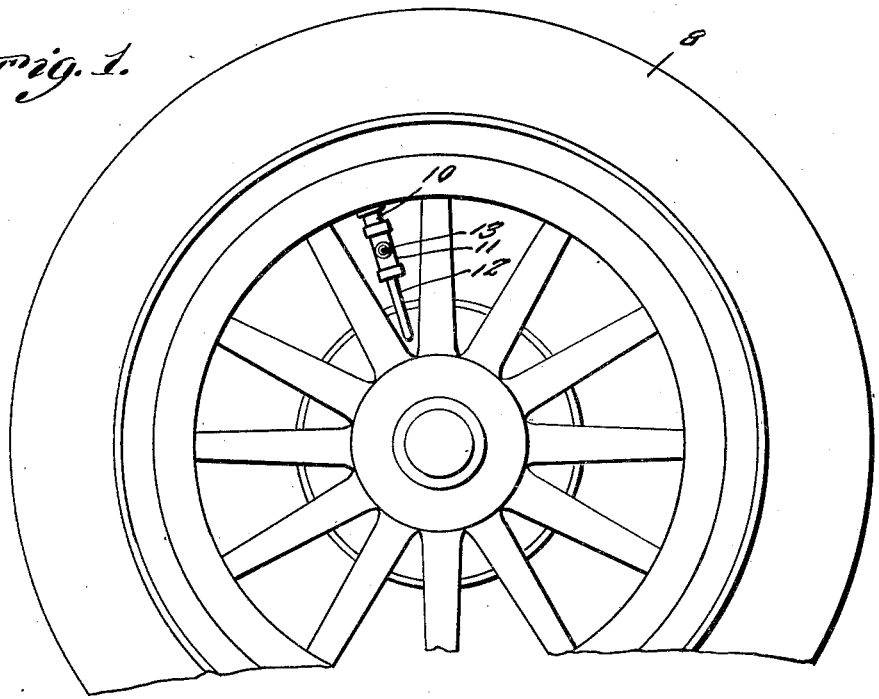
Figure 1 represents a fragmentary side elevational view of a pneumatic wheel equipped with the connection to the indicator.

Referring to the drawings wherein like numerals designate like parts, it can be seen that the wheels are tested selectively and that the meter denoted by numeral 5 is graduated in pound markings instead of the usual ampere readings. Numeral 6 generally refers to a resistant unit, one of which is provided for each of the wheels. Numeral 7 generally refers to the switch for selecting which of the wheels is to be tested on the gauge 5.

Referring now to Fig. 2, it can be seen that numeral 8 refers to the usual tire casing in which the tube 9 is located. Extending from this tube 9 is the usual valve shell 10, from which the valve elements are removed. This shell 10 is connected to the T-fitting 11 and from this T-fitting extends the tube 12, to one of the resistant units 6. A valve 13 is installed also in the T-fitting 11, and to this the usual inflating hose can be attached for inflating the tube 9 when desired.

The resisting unit includes a cylindrical shell closed at its end 15, and threaded at its end portion for disposition to the cap 16. A closure 17 is engageable over the opposite end of the shell 14 and this closure 17 is provided with a nipple 18 against which the flanged end of the tube 12 is clamped by the jamb nut 19.

Suitable packing means 20 can be installed between the flange of the tube 12 and the adjacent end of the nipple 18. A short tubular member 21 extends through the opening in the nipple 18 and is flanged at its inner and outer ends. The flanged inner end serves to secure one end of the multiple type felloe type diaphragm 22 to the closure 17 at the end of the diaphragm 22, and this has an inwardly disposed barrel 23, with a nut 24 secured to the outer end thereof.

Journaled through the closed end 15 of the shell 14 is a screw 25 which engages with the nut 24. The end of the screw 25 opposite from the end engaged by the nut 24 is embedded in or engages the head 26 at one end of the bolt 27, which bolt is secured to the di-electric body 28 by the nut 29.

This knob 26 has a contactor 30 projecting therefrom for wiping engagement with the helical type resistant element 31. One end of this element 31 is attached to the binding post 32 and from this binding post extends a conductor 33 to one of the contacts 34, of the switch 7. Suitable flanges 35 are provided on the shell 14 for facilitating attachment of the unit to the rotating part of the usual brake generally referred to by numeral 36.

On the mobile part of the brake 36 is the conductor annulus 37 which is engaged by the brush 38. From this brush extends a conductor through the armoured sheathing 39 to the switch 7, the conductor 33 of the resistant unit being specifically connected to the conductor strip 37 aforementioned.

Figures 4, 5:
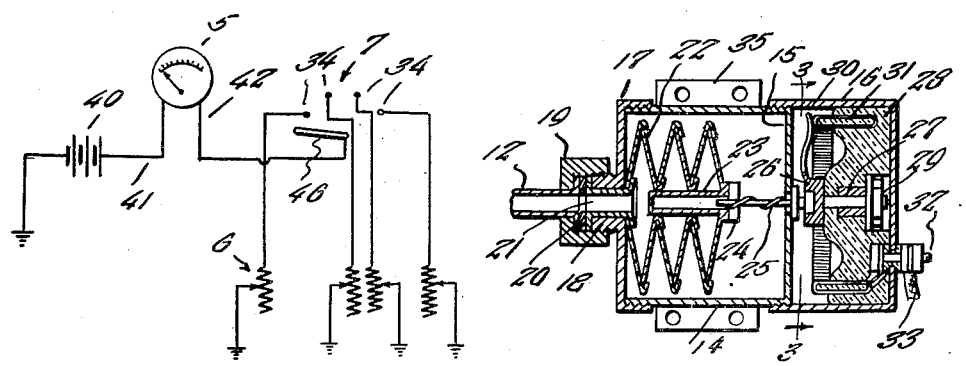
Fig. 4 represents a fragmentary longitudinal view through one of the resistance units.
Fig. 5 represents a diagrammatic view disclosing the electrical connections between the electrical devices involved.

Referring to Fig. 5, it can be seen that numeral 40 represents the automobile battery, one side of which is grounded, while the other side is connected by way of the conductor 41 to one side of the ammeter gauge 5. The opposite side of the gauge is connected by way of the conductor 42 to the switch 7.

It can be seen now, that by setting the contactor 43 on one of the contacts 34, the particular resistance to the circuit with the particular wheel will be registered on the gauge 5. In operation, air passes through the tube 12 to the diaphragm 22 and as the diaphragm is projected, the nut 24 revolves the screw 35. This carries the contactor 30 along the resistant element 31 and in this manner, the resistance of the circuit is varied so as to change the reading of the ammeter 5 to the corresponding poundage indication.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

1. A fluid operated resistor comprising a housing, a diaphragm mounted within one end of the housing, a fluid supply line communicating with the diaphragm, a barrel arranged in the diaphragm and carried thereby, a nut at the outer end of the barrel, a die-electric body in the opposite end of the housing, a resistance element arranged on the body, a contactor for riding engagement with the resistance element, a rotatably mounted screw, said screw at one end being disposed through the nut and into the barrel and at its opposite end attached to the said contactor.

2. A fluid operator of the character described comprising a housing, a pipe line leading into the housing, a diaphragm in the housing and communicating with the pipe line, a barrel in the diaphragm and carried thereby, a nut on the barrel, said housing being closed at its ends, a screw journalled through one end of the housing and provided with a connecting head at its outer end and being disposed through the nut and into the barrel at the diaphragm.

JAMES W. SWALLEN.